Figure 1:
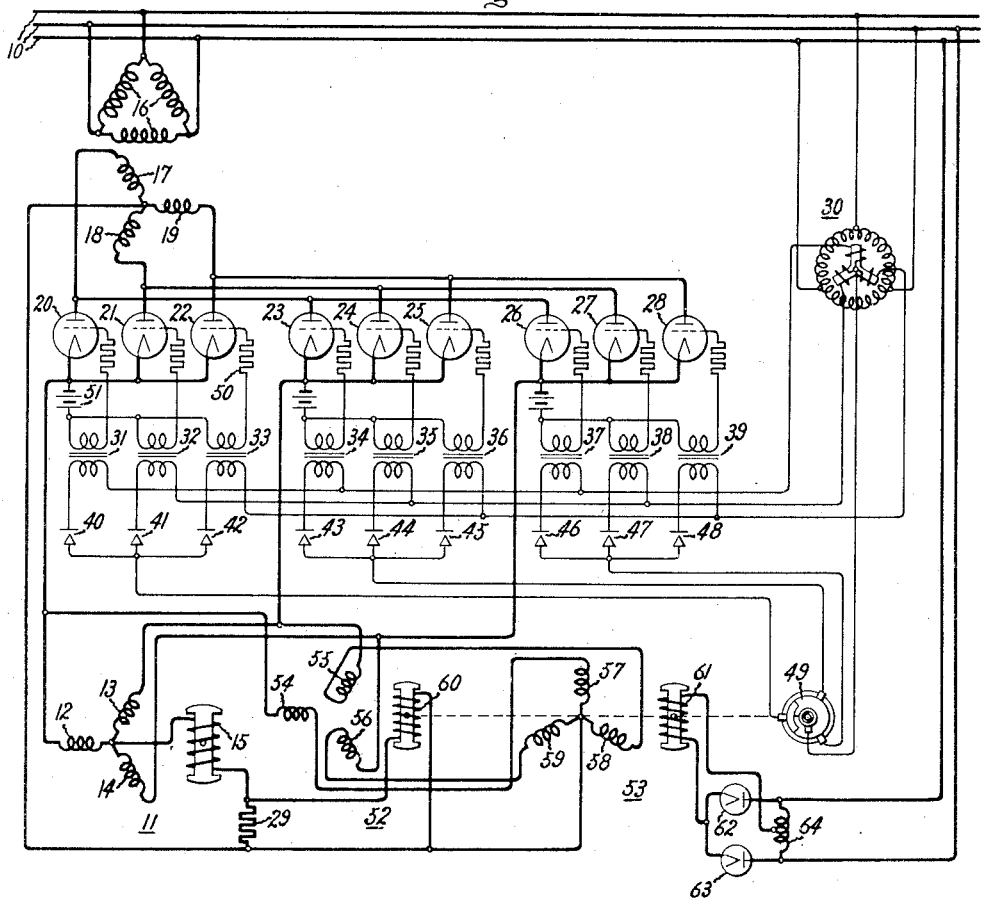

Nov. 26, 1940.   P. M. CURRIER   2,223,165
ELECTRIC VALVE CONVERTING SYSTEM
Filed April 28, 1938

Inventor:
Philip M. Currier,
by Harry E. Dunham
His Attorney.

Patented Nov. 26, 1940

2,223,165

UNITED STATES PATENT OFFICE 2,223,165

ELECTRIC VALVE CONVERTING SYSTEM

Philip M. Currier, Ballston Spa, N. Y., assignor to General Electric Company, a corporation of New York Application April 28, 1938, Serial No. 204,814

11 Claims. (Cl. 172—274)

My invention relates to electric valve converting systems and more particularly to control circuits for such systems suitable for transmitting energy between alternating current circuits of different frequencies.

Heretofore numerous electric valve converting systems have been utilized for transferring energy between alternating current circuits of different frequencies and numerous arrangements have been proposed for controlling electric valve converting systems in accordance with the voltage and current conditions of the output circuit. Since in many instances such arrangements have involved complicated auxiliary apparatus, it is desirable to obtain the desired control with a minimum amount of auxiliary apparatus. Where such electric valve converting systems have been utilized to control the speed of a motor or dynamo-electric machine it is desirable to obtain at the greater load conditions longer periods for commutation of the valves because of the increased current flowing therethrough and this may be obtained by controlling the converter in accordance with voltage and current conditions of the motor or output circuit. In accordance with my invention I compensate for a field distortion of the motor as the load increases by advancing the moment of ignition of the valves of the converter thereby obtaining a longer period for commutation for each of the valves.

It is, therefore, an object of my invention to provide an improved electric valve converting system utilizing a minimum of auxiliary apparatus for controlling the system in accordance with a plurality of electrical conditions of the output circuit.

It is a further object of my invention to provide an improved electric valve converting system for transferring energy between alternating current circuits of different frequencies in which the valve converting system is controlled in accordance with the voltage and current conditions of the output circuit.

It is a still further object of my invention to provide an improved electric valve converting system for transferring energy between an alternating current circuit and a motor in which the moments of ignition of the electric valves are advanced in accordance with increasing load upon the motor.

The novel features which are believed to be characteristic of this invention are set forth with particularity in the appended claims. My invention itself, however, both as to its organization and method of operation, together with further objects and advantages thereof, will be better understood by reference to the following description taken in connection with the accompanying drawing in which Fig. 1 represents an embodiment of my invention in an electric valve converting system for transferring energy between alternating current circuits of different frequencies; and Fig. 2 is explanatory of the operation of my invention.

Figure 2:
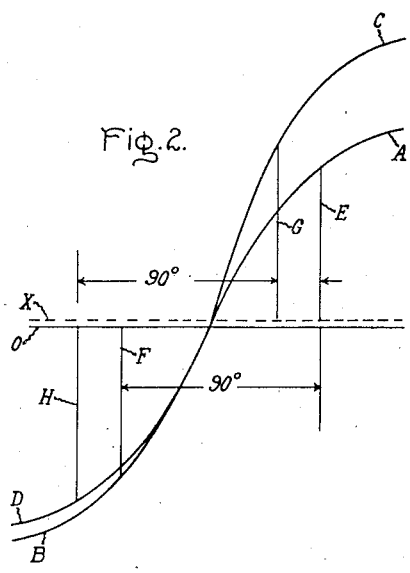

Referring now more particularly to Fig. 1 of the drawing, there is illustrated an arrangement embodying my invention for transferring energy between two alternating current circuits of different frequencies. For the purposes of illustration there has been shown a polyphase supply circuit 10 and an inductive load circuit 11 which may be in the form of a motor having a plurality of phase windings 12, 13 and 14 and a field winding 15. The primary winding 16 of a transformer is connected to be energized from the alternating current circuit 10 and the secondary windings 17, 18, 19 thereof form a part of an electric valve converting apparatus for controlling the transfer of energy between the alternating current circuit 10 and the load circuit 11. This electric valve converting apparatus includes a plurality of electric valves such as the valves 20 to 28, inclusive. While these valves may be any of those commonly known in the art it is preferable to utilize valves containing an ionizable medium and having an anode, a cathode and a control member which may be in the form of a starting electrode or control grid. Three of the valves 20, 21 and 22, each having their anodes connected to one of the transformer secondary windings 17, 18 and 19, respectively, have all of their cathodes connected together and to the phase winding 12 of the dynamo-electric machine 11. Each of the valves 23, 24 and 25 have their anodes connected respectively to the transformer secondary windings 17, 18 and 19 and their cathodes all connected together to the phase winding 13 of the motor 11. Similarly, the anodes of valves 26, 27 and 28 are connected respectively to the secondary transformer windings 17, 18 and 19 and the cathodes thereof are connected together to the phase winding 14 of the motor 11. The phase windings 12, 13 and 14 of the motor 11 are connected in star relation so that the neutral point thereof is connected to one terminal of the field winding 15 of the motor which is connected in turn through a suitable resistor 29, the purpose of which will become apparent later, to the neutral point of the transformer secondary windings 17, 18 and 19.

A control circuit is provided for controlling the moments of ignition of the various valves 20 to 28 of the electric valve converting system and this includes a suitable source of potential which may be derived from the alternating current circuit 10 by means of a suitable phase shifting device 30. The potential from the phase shifting device 30 is applied to the respective control transformers 31 to 39 inclusive through a plurality of unilaterally conductive devices 40 to 48 by means of a distributor mechanism 49. Each of the grid circuits of the valves 20, 21 and 22 respectively includes a suitable current limiting resistor such as 50 and a source of biasing potential 51 and one of the secondary windings of each of the transformers 31 to 33 respectively. The grid circuits of each of the remaining valves 23 to 28 respectively also include similar current limiting resistors and sources of biasing potentials together with the secondary windings of the transformers 34 to 39 respectively. The distributor mechanism 49 is actuated by a plurality of dynamo-electric machines 52 and 53 and which are coupled together and may be referred to as a motor generator set. The dynamo-electric machine 52 is provided with a plurality of phase windings 54, 55 and 56 which are connected in series with a plurality of phase windings 57, 58 and 59, respectively, of the dynamo electric machine 53. These two sets of phase windings are arranged to be energized in accordance with the potentials appearing across the phase windings 12, 13 and 14, respectively, of the dynamo-electric machine or motor 11. A field winding 60 of the dynamo-electric machine 52 is energized in accordance with the variations of current flowing through the field winding 15 of the dynamo-electric machine 11 by connecting it in parallel to the resistor 29 which is connected in series with the dynamo-electric machine 11. The dynamo-electric machine 53 is provided with a field winding 61 which is separately excited from any suitable source of direct current which may be obtained in the manner shown by means of a rectifier comprising a pair of valves 62 and 63 and a suitable inductive device 64 which is energized from one of the phases of the alternating current circuit 10. One set of windings of the dynamo-electric machines 52 and 53 are arranged in the same position as for instance, the field windings 60 and 61 may be mounted in similar positions on the common shaft which rotates the distributor mechanism 49. The remaining sets of windings of these machines are then so arranged that the respective windings are electrically displaced from each other by a predetermined amount so that in the present example the phase winding 54 of the dynamo-electric machine 52 is at right angles to the phase winding 57 of the dynamo-electric machine 53 and similarly each of the remaining phase windings of the dynamo-electric machine 52 are at right angles to corresponding phase windings of the other dynamo-electric machine 53. Due to this displacement of one set of windings relative to the other, one of these machines in operation tends to act as a generator whereas the other of the machines tends to act as a motor and hence for convenience this arrangment is referred to as a motor-generator torque set.

The general principles of operation of the arrangement shown in Fig. 1 for transmitting energy between the alternating current circuit 10 and the motor 11 will be well understood by those skilled in the art, and will be found in greater detail in U. S. Letters Patent Reissue No. 20,364, granted May 18, 1937, upon an application of E. F. W. Alexanderson, and in U. S. Letters Patent No. 1,971,833, granted August 28, 1934, upon an application of E. L. Phillipi, and which are both assigned to the same assignee as the present application. Reissue Patent No. 20,364 discloses and broadly claims the above described power circuit as well as the feature of collectively energizing the grids or control electrodes of the several electric valves from the source of alternating potential through a distributor means. Patent No. 1,971,833 discloses and broadly claims the use of unilaterally conductive devices in connection with the distributor for obtaining a simplified control of the moments of ignition of the valves. It is therefore apparent that the speed of the dynamo-electric machine 11 depends upon the frequency of the alternating current supplied thereto by means of the electric valve converting apparatus and that the valves of this apparatus are rendered conductive in proper sequence by the application of the control potential by means of the distributor mechanism 49. The distributor mechanism 49 is so adjusted as to provide the the proper time for ignition of the various electric valves for a predetermined speed and load of the dynamo-electric machine 11. Upon increased load upon the motor or dynamo-electric machine 11 resultant torque of the auxiliary dynamo-electric machines 52 and 53 comprising the motor-generator torque set will be such as to advance properly the moments of ignition of the various valves 20 to 28, inclusive, due to a resultant change in the relative position of the shaft of these machines.

By referring to Fig 2 of the drawing the operation of the auxiliary dynamo-electric machines 52 and 53 will become more apparent. As has been stated, one of these auxiliary machines tends to operate as a generator whereas the other of the machines tends to operate as a motor. Fig. 2 therefore shows the motor and generator torque curves A and B of these auxiliary machines for a certain predetermined speed and load of the dynamo-electric machine 11. Since the various phase windings of the machine 52 are at right angles to the respective phase windings of the machine 53 the distance from the point on the curve A to the point on the curve B is necessarily equal to 90 electrical degrees. If it is assumed that the friction of the distributor mechanism is equal to the distance between the zero line O and the dotted line X, it will become apparent that measurments must be made along the curve A from the dotted line X. Since the fields of these machines are on the same shaft it is apparent that the torques of the machines must be balanced so that the torque represented by the line E is of the same magnitude as the torque represented by the line F. If it is now assumed that the current and voltage conditions appearing across the dynamo-electric machine 11 are changing, it will be apparent that the torque curve of the machine which is separately excited may decrease a small amount as indicated by the curve D whereas in the other machine both the voltage and current conditions are changing so that its resultant torque curve is appreciably increased as indicated by the curve C. Under these conditions the torque of the separately excited machine may remain relatively constant or change an inappreciable amount, but for purpose of illustration the change in torque has been shown to be appreciable in the drawing by curves B and D. Since under these new conditions of current and voltage the torques of the two machines must again be balanced at points which are 90 electrical degrees apart on the curves C and D, it will be found that the torque represented by the line G is equal to the torque represented by the line H and that the resultant positions of the lines G and H are displaced to the left of the torque lines E and F. This means that the shaft of the dynamo-electric machines 52 and 53 has assumed a new position relative to the magnetic fields of the armature windings of these machines. This new position, therefore, has resulted in a shifting or adjustment of the operation of the rotatable elements of the distributor means 49. This adjustment is in such direction as to advance the moments of ignition of the valves 20 to 28, inclusive, thus increasing the allowable commutation period of each valve. Thus, this motor generator torque set is responsive to a plurality of electrical conditions of the output circuit of the electric valve converting apparatus to effect a corresponding adjustment of the distributor means.

While in the arrangement shown the alternating current motor 11 has been indicated as being of the type as having a group of phase windings and a field winding connected in series with the neutral thereof, it will, of course, be apparent to those skilled in the art that the principles of this arrangement may be applied to other motor connections such as the motor arrangement disclosed in the Alexanderson and Phillipi patents referred to above. It furthermore will be apparent that this method of control of the electric valve converting system is equally applicable to frequency changer arrangements wherein the load device connected to the output circuit does not comprise a dynamo-electric machine.

While I have shown a particular embodiment of my invention, it will, of course, be understood that I do not wish to be limited thereto, since it is apparent that the principles herein disclosed are susceptible of numerous other applications, and modifications may be made in the circuit arrangement and in the instrumentalities applied without departing from the spirit and scope of my invention as set forth in the appended claims.

What I claim as new and desire to secure by Letters Patent of the United States is:

1. In combination, a source of alternating current, a load circuit, a plurality of electric valves for transmitting energy therebetween, a control circuit for said valves including a source of control potential and a distributor connected in series therewith, a plurality of dynamo-electric machines coupled together for driving said distributor, and means for controlling both said dynamo-electric machines in accordance with a plurality of electrical conditions of said load circuit thereby to effect a corresponding adjustment of said distributor.

2. In combination, a source of alternating current, a load circuit, a plurality of electric valves for transmitting energy therebetween, a control circuit for said valves including means for deriving a potential component from said source, a distributor connected serially with said means, a plurality of dynamo-electric machines coupled together for driving said distributor, and means for energizing both said dynamo-electric machines in accordance with a plurality of electrical conditions of said load circuit.

3. In combination, a source of alternating current, a load circuit, a plurality of electric valves for transmitting energy therebetween, a control circuit for said valves including a source of control potential, a distributor connected serially with said control potential, and a plurality of dynamo-electric machines coupled together for driving said distributor, means for separately exciting one of said machines, means for exciting the other of said machines in accordance with the current conditions of said load circuit, and means for supplying energy to both of said machines in response to potential conditions of said load circuit.

4. In combination, a source of alternating current having a certain frequency, an alternating current load circuit having a different frequency, a plurality of electric valves for transmitting energy therebetween, a control circuit for said valves including a source of control potential and a distributor connected serially therewith, means for rotating said distributor at a speed corresponding to the frequency of said load circuit, and means for modifying the operation of said latter means in accordance with the potential and current conditions of said load circuit to vary the adjustment of said distributor.

5. The combination comprising a source of current, a dynamo-electric machine, means interconnecting said source and said machine comprising a plurality of electric valves each provided with a control electrode, adjustable means for impressing upon said electrodes a potential derived from said source, distributor means interposed between said control electrodes and said adjustable means for controlling the operation of said valves, and means directly responsive to two electrical conditions of said machine for controlling the operation of said distributor means.

6. The combination of a source of current, a dynamo-electric machine, means including a plurality of electric valves interconnecting said source and said machine for transmitting energy therebetween, each of said valves being provided with a control electrode, a mechanism comprising a stationary element and a rotating element for successively exciting the control electrodes of said valves, and a plurality of auxiliary dynamo-electric machines rigidly coupled together for driving said rotating element, said auxiliary machines both being energized in accordance with several electrical conditions of said machine whereby said auxiliary machines vary the angular position of said rotating elements.

7. The combination comprising a source of current, a dynamo-electric machine, means interconnecting said source and said machine comprising a plurality of valves each provided with a control electrode, a control circuit for said control electrodes including adjustable means for impressing upon said electrodes the potentials derived from said source, distributor means interposed between said control electrodes and said adjustable means for controlling the moments of ignition of said valves, and means directly responsive to at least two electrical conditions of said dynamo-electric machine for driving said distributor means whereby the moments of ignition of said electric valves are advanced in accordance with changes in the load condition of said dynamo-electric machine.

8. The combination of a source of current, a dynamo-electric machine, means including a plurality of electric valves interconnecting said source and said machine for transmitting energy therebetween, each of said valves being provided with a control electrode, a control circuit for said electrodes including adjustable means driven by a motor-generator torque set for controlling the connections of the control circuit with said control electrodes, and means for energizing said motor-generator torque set in accordance with both the voltage and current conditions of said dynamo-electric machine.

9. The combination of a source of current, a dynamo-electric machine, means including a plurality of electric valves interconnecting said source and said machine for transmitting energy therebetween, each of said valves being provided with a control electrode, a control circuit for said control electrodes including a distributor mechanism comprising a stationary element and a rotating element for successively exciting the control electrodes of said valves, and a motor-generator torque means for driving said rotating element, said motor-generator torque means being energized in accordance with both the voltage and current conditions of said dynamo-electric machine thereby to vary the operation of said distributor mechanism.

10. The combination comprising a source of current, a dynamo-electric machine, an electric valve converting apparatus interconnecting said source and said machine, a control circuit for the valves of said apparatus including a distributor mechanism comprising rotating and stationary elements, a pair of auxiliary dynamo-electric machines coupled together for driving said rotating element, means for energizing one of said auxiliary machines in response to an electrical condition of said first dynamo-electric machine, and means for energizing the other of said auxiliary machines in response to another electrical condition of said first dynamo-electric machine whereby the angular position of said rotating element is varied.

11. The combination comprising a dynamo-electric machine, a source of current, an electric valve converting apparatus interconnecting said source and said machine, a control circuit for the valves of said apparatus including a distributor arranged on a shaft common to a pair of auxiliary dynamo-electric machines, one of the windings of one of said auxiliary machines being electrically displaced a predetermined amount from one of the windings of the other of said auxiliary machines, means for separately exciting one of said auxiliary machines, means for exciting the other of said auxiliary machines in response to an electrical condition of asid first dynamo-electric machine, and means for supplying energy to both said auxiliary machines in response to another electrical condition of said first dynamo-electric machine.

PHILIP M. CURRIER.